US011341611B2

(12) United States Patent
Ding et al.

(10) Patent No.: US 11,341,611 B2
(45) Date of Patent: May 24, 2022

(54) AUTOMATIC GENERATION OF PERCEIVED REAL DEPTH ANIMATION

(71) Applicant: VideoSlick, Inc., San Jose, CA (US)

(72) Inventors: Zhehang Ding, San Jose, CA (US); Zihong Fan, Los Altos, CA (US); Gavan Kwan, Los Altos, CA (US)

(73) Assignee: VideoSlick, Inc., San Jose, CA (US)

( * ) Notice: Subject to any disclaimer, the term of this patent is extended or adjusted under 35 U.S.C. 154(b) by 34 days.

(21) Appl. No.: 17/086,408

(22) Filed: Nov. 1, 2020

(65) Prior Publication Data

US 2021/0133928 A1    May 6, 2021

Related U.S. Application Data

(60) Provisional application No. 62/929,736, filed on Nov. 1, 2019.

(51) Int. Cl.
| | |
|---|---|
| *G06T 15/20* | (2011.01) |
| *G06T 13/20* | (2011.01) |
| *G06T 13/80* | (2011.01) |
| *G06T 3/40* | (2006.01) |
| *G06T 5/00* | (2006.01) |
| *G06T 7/70* | (2017.01) |

(52) U.S. Cl.
CPC ............. *G06T 3/4084* (2013.01); *G06T 3/40* (2013.01); *G06T 3/4053* (2013.01); *G06T 5/003* (2013.01); *G06T 7/70* (2017.01); *G06T 13/20* (2013.01); *G06T 13/80* (2013.01); *G06T 15/205* (2013.01)

(58) Field of Classification Search
CPC .......................... G06T 13/80; H04N 2213/006
See application file for complete search history.

(56) References Cited

U.S. PATENT DOCUMENTS

| | | | |
|---|---|---|---|
| 2013/0044104 A1* | 2/2013 | Bouie ..................... | G09G 5/00 345/419 |
| 2013/0127838 A1* | 5/2013 | Derrig .................... | G06T 15/00 345/419 |
| 2013/0155180 A1* | 6/2013 | Wantland ............... | G06T 13/80 348/36 |
| 2018/0270464 A1* | 9/2018 | Harviainen .......... | H04N 21/6587 |
| 2020/0301549 A1* | 9/2020 | Aroche Martinez ... | G06T 15/20 |

* cited by examiner

*Primary Examiner* — Ryan McCulley
(74) *Attorney, Agent, or Firm* — Fenwick & West LLP

(57) ABSTRACT

The disclosure is related to systems and methods for generating an animation with a perception of real depth from one or more images. In some embodiments, a computing server may receive an input image. The input image captures a scene. The computing server may generate a set of layers of images, which may include one or more processed images. A processed image may be a version of the input image. The computing server may generate one or more variable masks that are used for a superposition of the set of layers. The variable masks may include a plurality of regions specifying different compositions of the layers in the superposition. The computing server may generate an animation of the scene from the set of layers. The animation may include a composite frame generated from the set of layers of images superimposed according to the variable masks.

21 Claims, 12 Drawing Sheets

AUTOMATIC GENERATION OF PERCEIVED REAL DEPTH ANIMATION

CROSS-REFERENCE TO RELATED APPLICATION

This application claims the priority to U.S. Provisional Application No. 62/929,736, filed on Nov. 1, 2019, which is incorporated by reference herein for all purposes.

FIELD

This disclosure is generally related to image processing techniques and more specifically related to generating animations with the perception of real depth from images.

BACKGROUND

Digital images, particularly those compressed under conventional formats, often include a dataset of color values that together generate the content of the images. Since the images are often stored as data bits, certain important information regarding the objects and the scene captured in the images is lost. For example, the contextual information of the scene captured in an image is often not included in a typical image format. The image also usually only reflects the color values as captured by the camera, which may not be set in the optimal setting. A static image also often appears to viewers as unappealing.

SUMMARY

This disclosure is related to systems, methods, and computer readable media that store instructions for performing one or more image processing techniques to generate an animation with a perception of real depth from an image. In accordance with some embodiments, a computer-implemented method is described. The computer-implemented method may include receiving an input image. The input image may capture a scene. The computer-implemented method may also include generating a set of layers of images of the scene. The set of layers may include one or more processed images. A processed image may be a version of the input image. The computer-implemented method may further include generating one or more variable masks that are used for a superposition of the set of layers. The variable masks may include a plurality of regions specifying different compositions of the layers in the superposition. The computer-implemented method may further include generating an animation of the scene from the set of layers. The animation includes a change of perspectives of the scene. A perspective of the scene may correspond to a composite frame generated from the set of layers of images superimposed according to the variable masks specifying the different compositions of the layers in the plurality of regions. The different compositions in the plurality of regions may change as the perspectives of the scene in the animation change.

In yet another embodiment, a non-transitory computer readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

This disclosure is related to systems, devices, and processes for generating an animation from an image. The animation may be associated with various visual effects, such as a visual effect that gives the animation a perception of real depth. A computing server may provide a user interface for a user to upload an image and control the interface for the generation of the animation from the image. The computing server may provide one or more scene templates for the user to select. The user may adjust the parameters of the template and control a virtual camera that simulates a video capturing of the content in the uploaded image. For example, the user may adjust the position, angle, speed, path, and rotation of the camera.

From the input image, the computing server may generate a set of layers of images. One or more layers may include an image that is processed by an image processing technique. The computing server may generate masks for determining the compositions of the layers. The computing server may generate images based on a projection matrix that is determined from the angle and location of the virtual camera. The computing server may superimpose the layers of images based on the masks to generate a frame in the animation. The compositions of the layers may be determined based on the position of the camera. A projection matrix may be calculated based on the camera position and angle and can be used to adjust the perspective of the frame.

Example System Environment

Figure 1:
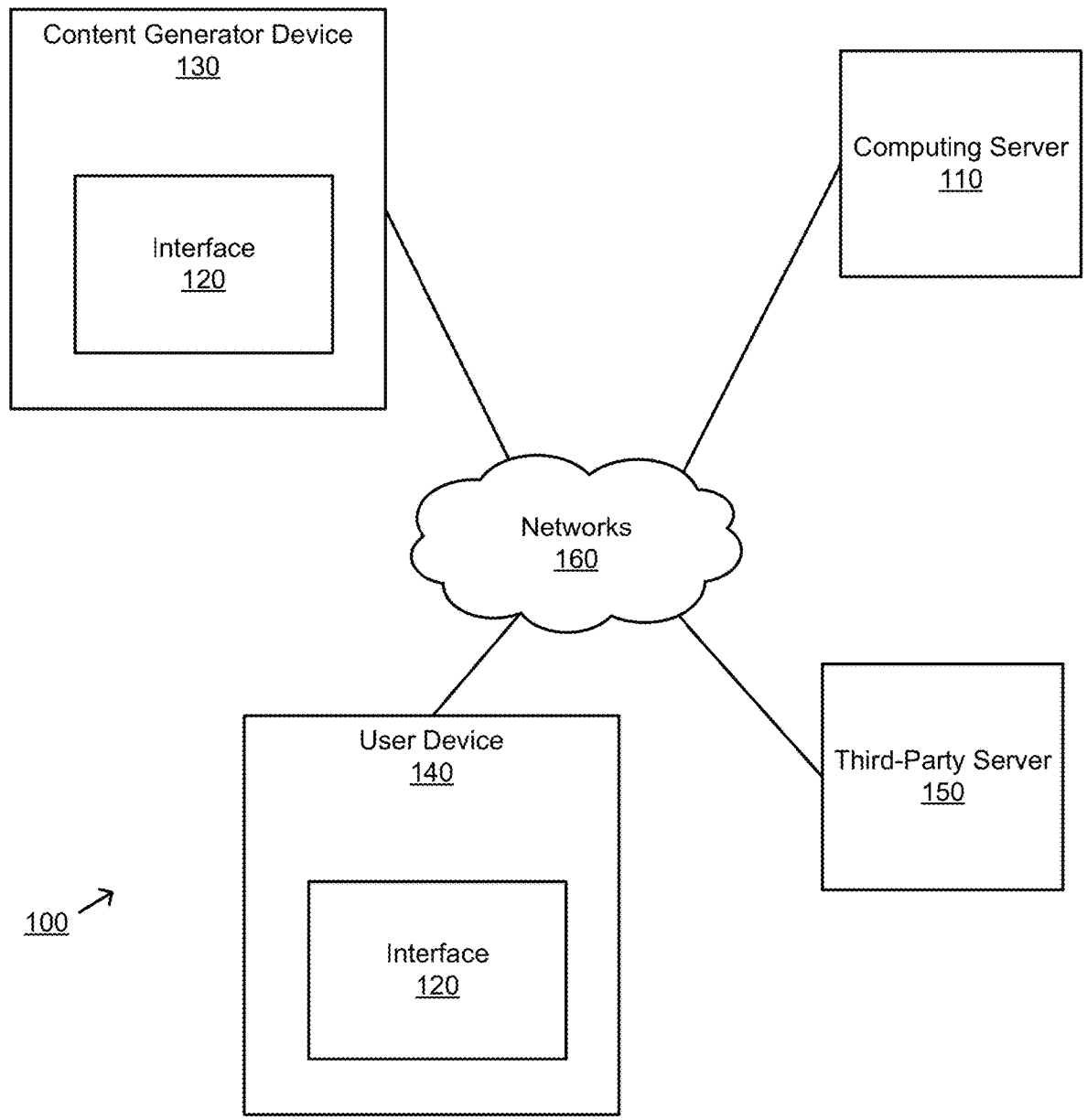
FIG. 1 is a block diagram illustrating a system environment for generating an animation, in accordance with some embodiments.

Referring now to Figure (FIG. 1, shown is a block diagram illustrating an embodiment of an example system environment 100 for generating an animation, in accordance with some embodiments. By way of example, the system environment 100 may include a computing server 110, a content generator device 130, a user device 140, a third-party server 150, and networks 160. In various embodiments, the system environment 100 may include fewer or additional components. The system environment 100 also may include different components. Also, while some of the components in the system environment 100 may sometimes be described in a singular form, the system environment 100 may include one or more of each of the components. Also, in some implementations or situations, certain components' roles may overlap. For example, in some cases, the content generator device 110 may also be a user device 140. In some cases, the computing server 110 may perform the functionalities of the third-party server 150.

While some of the components in the system environment 100 may at times be described in a singular form while other components may be described in a plural form, the system environment 100 may include one or more of each of the components. For simplicity, multiple instances of a component in the system environment 100 may be referred to in a singular form even though the system may include one or more such entities or components. For example, in one embodiment, while the user device 140 may at times be referred to in a singular form, the system environment 100 may include multiple user devices, each associated with an end user. Conversely, a component described in the plural form does not necessarily imply that more than one copy of the component is always needed in the environment 100.

The computing server 110 may provide various services related to content editing and automatic generation of multimedia content. The computing server 110 may also be referred to as a multimedia processing server, a content editing server, a content composition site, an online system, a social networking system, a property listing system, and a video sharing platform, depending on the implementation. Users of the computing server 110 may upload content to the computing server 110 for edits, enhancement, rescaling, formatting, and other image processing operations. Content may include videos, images, audio, music, text, and other data that may take other suitable forms. For example, users may upload various content files and select a compilation process provided by the computing server 110 to combine the files into a single multimedia file with enhanced effect. For examples of content editing services provided by the computing server 110, U.S. Pat. No. 10,264,324, issued on Apr. 16, 2019, entitled "System and Method for Group-based Media Composition," is incorporated by reference herein for all purposes.

One content editing service provided by the computing server 110 may be the generation of an animation of a scene that resembles a video taken at the scene with apparent three-dimensional depths. The animation may be generated automatically by the computing server 110 from a single static image or a series of images of the scene uploaded by a user. The animation may be referred to as a video and may include background music that is added when the animation is generated. The animation, generated by the image, may include a change of perspectives of the scene that appears to be a camera moving relative to the scene. In some cases, multiple images related to the same scene may be provided to the computing server 110 for the computing server 110 to generate multiple animations and compile the animations to a longer video. The video may be used to introduce the scene and presented as if the video were taken by a cameraman walking around to film the scene.

The computing server 110 may take the form of a combination of hardware and software. The computing server 110 may include some or all example components of a computing machine described with FIG. 6. The computing server 110 may take different forms. In one embodiment, the computing server 110 may be a server computer that executes code instructions to perform various processes described herein. In another case, the computing server 110 may be a pool of computing devices that may be located at the same geographical location (e.g., a server room) or be distributed geographically (e.g., clouding computing, distributed computing, or in a virtual server network). The computing server 110 may also include one or more virtualization instances such as a container, a virtual machine, a virtual private server, a virtual kernel, or another suitable virtualization instance. The computing server 110 may provide other components in system environment 100 with various content editing services. In some embodiments, the computing server 110 may provide service as a form of cloud-based software, such as software as a service (SaaS), through the networks 160.

A content generator device 130 may be associated with a content generator who may be a customer of the computing server 110. The content generator may be someone who captures images, sounds, videos of a scene and uploads the content to the computing server 110 for further editing or enhancement. For example, a content generator may take images using the camera of the content generator device 130, which stores the images in the memory of the device 130. Alternatively, or additionally, a machine may also automatically capture images of a scene. The content generator device 130 may communicate with the computing server 110 for the upload of the content to the computing server 110. After processing, the computing server 110 may transmit the processed content to the content generator device 130 or may directly upload the processed content to a destination selected by the content generator.

The content generator device 130 may include an interface 120 that allows the content generator to communicate with the computing server 110. The interface 120 provides functionalities for the content generator to upload and select different content editing functionalities of the computing server 110. The interface 120 may be provided by the computing device 110. For example, a content generator may communicate to the computing server 110 through a web browser such as CHROME, FIREFOX, SAFARI, INTERNET EXPLORER, EDGE, etc. The interface 120 may be part of the website or web application of the computing server 110. In another case, the computing server 110 may publish a mobile application or a desktop application that includes a graphical user interface (GUI). A content generator may download the application and use the mobile or desktop application to communicate with the computing server 110. In yet another case, the content generator device 130 may communicate directly with the computing server 110 via other suitable ways such as application program interfaces (APIs).

Figure 6:
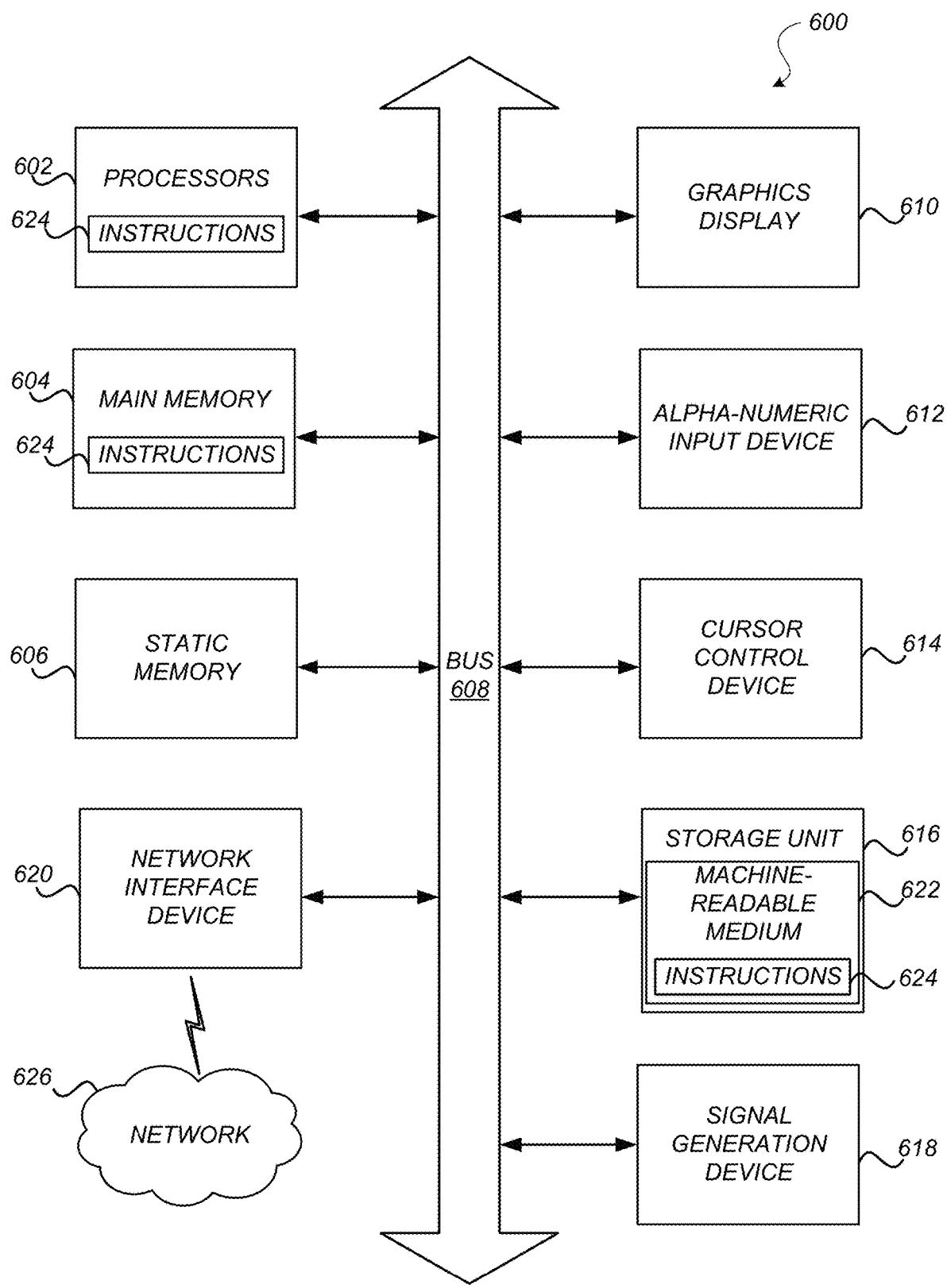
FIG. 6 is a block diagram illustrating components of an example computing machine, in accordance with some embodiments.

A user device 140 is a computing device that may transmit and receive data via the networks 160. Some or all of the components of a user device 140 is illustrated in FIG. 6. The user device 140 also may be referred to as a client device or an end user device. Various user devices 140 may belong to different parties or may be associated with individual end users. The user devices 140 may be any computing devices. Examples of such user devices 140 include personal computers (PC), desktop computers, laptop computers, tablets (e.g., iPADs), smartphones, wearable electronic devices such as smartwatches, or any other suitable electronic devices. Similar to the content generator device 130, the user device 140 may include an application and interface 120 provided by the computing server 110 for the generation and edits of multimedia content.

A user may be an end user of the computing server 110, of the content generator device 130, or of the third-party server 150. In some cases, the content generator may be a user of the computing server 110 and the content generator device 130 may be an example of user device 140. For example, the computing server 110 may operate a social networking system that includes content editing features for users to upload and edit content. In such a case, the content generator and viewing users are both examples of the users who are in control of various user devices. In some cases, a user may be a customer of the content generator. For example, a user may be a viewer of the multimedia content that is generated by the content generator using the service of the computing server 110. In some cases, a user may be a customer of the third-party server 150, which may serve as a content hosting platform for a content generator to upload and post content that are generated using the service of the computing server 110. For example, the third-party server 150 may be an online real estate search platform that posts animations of images of a property uploaded by a content generator, which may be the owner or agent for the property. Users may view the animation of the property through the third-party server 150.

The third-party server 150 may be a server that is operated by another entity other than the entity that controls the computing server 110. The third-party server 150 can be of any nature such as social networking, real estate brokerage, listing, advertising, information and news sharing, etc. The third-party server 150 may be a host of the content generated by the computing server 110 and may distribute the content to various users. For example, a content generator may upload content for the computing server 110 to process. In turn, the computing server 110 may upload the processed content directly to the third-party server 150 or may return the processed content to the content generator device 130 for the content generator to post the content to the third-party server 150. In some embodiments, the computing server 110 may perform the functionalities of the third-party server 150 so that the third-party server 150 does not exist in the system environment 100.

The computing server 110 may provide services to various users through different methods, depending on the situations or implementations. For example, in one case, the computing server 110 may provide software application to a user device 140 for generating various enhanced multimedia content. In another case, the computing server 110 may be a part of a backend server of an online system that provides various services that may or may not be directly related to content editing. For example, the entity operating the computing server 110 may be a social networking system or a real estate search platform that also provides the functionalities of video and image editing. In yet another case, the computing server 110 may provide its functionalities as part of cloud-based software, such as software as a service (SaaS), through the networks 160, for the third-party server 150.

The networks 160 provide connections to the components of the system environment 100 through one or more sub-networks, which may include any combination of the local area and/or wide area networks, using both wired and/or wireless communication systems. In one embodiment, the networks 160 use standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the networks 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over networks 160 may be represented using any suitable format, such as hypertext markup language (HTML), extensible markup language (XML), JavaScript object notation (JSON), structured query language (SQL). In some embodiments, all or some of the communication links of networks 160 may be encrypted using any suitable technique or techniques such as secure sockets layer (SSL), transport layer security (TLS), virtual private networks (VPNs), Internet Protocol security (IPsec), etc. The networks 160 also include links and packet switching networks such as the Internet.

Example Animation Generation Processes

Figure 2A:
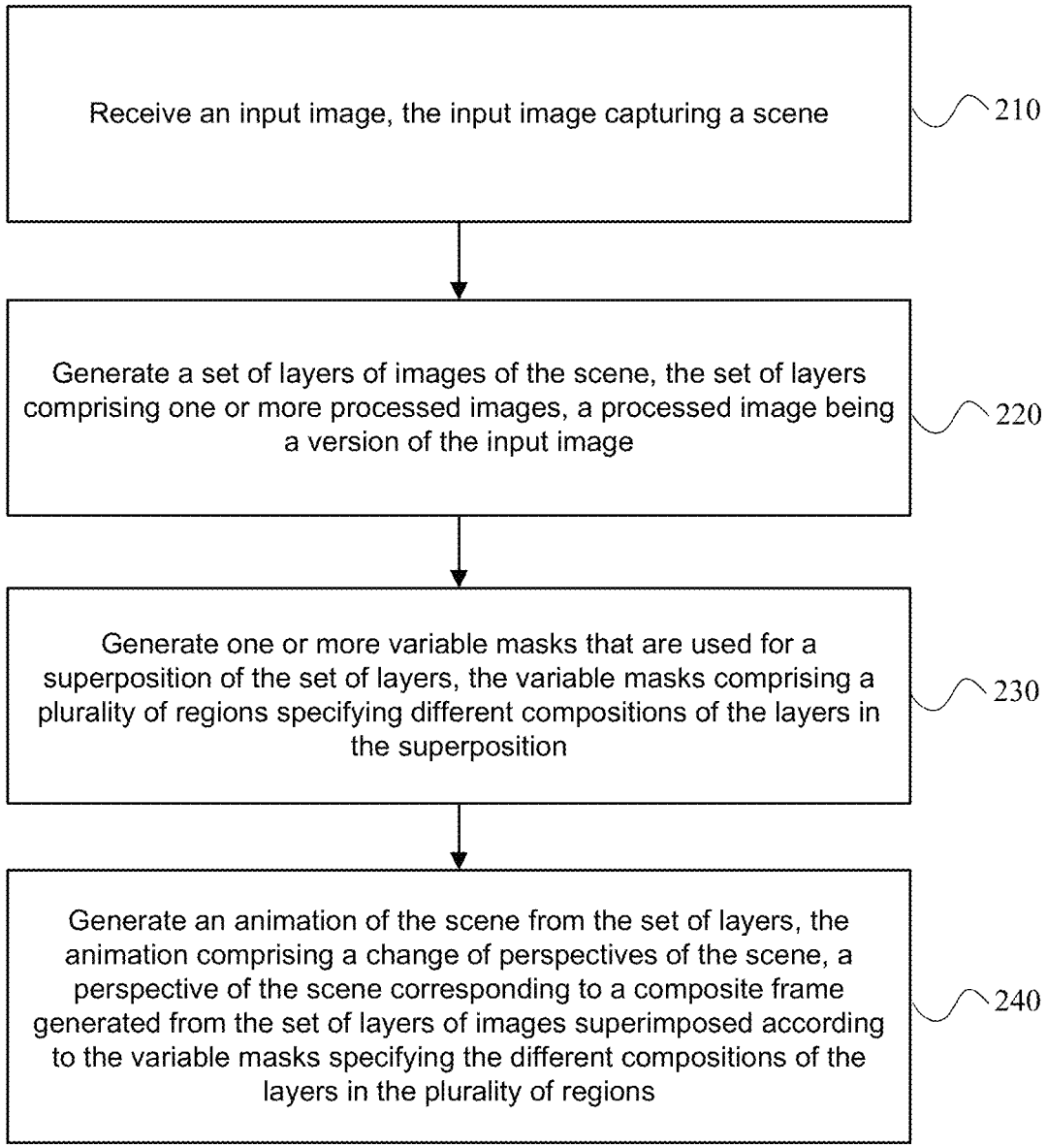
FIG. 2A is a flowchart depicting an example process that illustrates a software algorithm for generating an animation based on an input image, in accordance with some embodiments.

FIG. 2A is a flowchart depicting an example process 200 that illustrates a software algorithm for generating an animation based on an input image, in accordance with some embodiments. The software algorithm may be stored as computer instructions that are executable by one or more general processors (e.g., CPUs, GPUs, TPUs). The instructions, when executed by the processors, cause the processors to perform various steps described in the process 200. In various embodiments, one or more steps in the process 200 may be skipped or be changed. The process 200 may be performed by the computing server 110. While the process 200 and other processes discussed in this disclosure may be described as being performed by the computing server 110, these processes may also be performed by other suitable computers. For example, the company operating the computing server 110 may also publish a software application that can perform the similar image processing techniques and can be installed in a user device 140 or a content generator device 130.

Figure 5A:
FIGS. 5A, 5B, and 5C illustrate the effect of a mask on a layer of image, in accordance with some embodiments.

By way of example, the computing server 110 may receive 210 an input image capturing a scene. An example input image is shown in FIG. 5A. The computing server 110 may receive 210 the input image through user upload. The computing server 110 may also retrieve the input image from a storage such as a Cloud storage. A scene may be any suitable location. The environment of the scene may include various objects. For example, in one case, a scene may be a natural scene such as a location with a natural landmark. In another case, a scene may be an indoor location such as a room in a house. In one embodiment, pictures of the rooms in a residential or commercial unit (e.g., a house, an apartment, an office) may be taken and uploaded to the computing server 110 to generate a video to introduce the unit. The video may be posted to a commercial site such as a real estate search platform for the leasing or selling of the unit. In yet another case, a scene may be a tourist attraction location. A video may be generated to introduce the tourist attraction location. In yet another case, a scene may be a location where an event, such as a live event, takes place. In yet another case, images of a scene may focus and capture an object, such as artwork, a person, a plant, or any suitable object. In yet another case, a scene could be an artificial synthetic scene, a virtual scene, or a digitally compiled scene. Other suitable scenes are possible in various embodiments.

In response to receiving the input image, the computing server 110 may load a 3D-scene template with multiple layers (e.g., three layers) and a virtual camera. The computing server 110 may generate 220 a set of layers of images of the scene. The set of layers may include one or more processed images. A processed image is a version of the input image. For example, the computing server 110 may filter, compress, interpolate, extrapolate, crop, resize, upscale, downscale, and/or otherwise adjust the brightness, chromaticity, luminance, contrast, saturation in or more color channels (in RGB, XYZ, etc.). An image file may be converted from one image format to another image format (e.g., from raw to JPEG, etc.). One or more filters may also be applied to the input image. A version of the input image may refer to a processed image or the original image received by the computing server 110.

In some cases, the set of layers of images of the scene may include the original image and one or more processed images. In other cases, every layer in the set has been modified from the original image. In one embodiment, the set of layers may include a series of images that are scaled from the input image. For example, the first layer may include the original image or an unscaled processed image. The second layer may include a resized image (a scaled version) that is smaller than or that has a lower resolution than the image in the first layer. The third layer may include another resized image (another scaled version) that is smaller than or that has a lower resolution than the image in the second layer. The set of layers of images may include two or more layers.

The computing server 110 may generate 230 one or more variable masks that are used for a superposition of the set of layers. The variable masks include a plurality of regions. Each region may specify different compositions of the layers in the superposition. For example, a variable mask may divide the image into multiple cells. Each cell corresponds to a region of the image. Each cell may specify the composition of the region of the layers within the cell. For example, a particular cell of the variable mask may specify the transparency of the layer. If the layer is transparent at the particular cell, the image in the subsequent layers will be visible. In contrast, if a cell at a particular layer is completely opaque, the layer will cover the subsequent layers at the cell location. The computing server 110 may generate more than one variable mask. For example, there can be a series of variable masks, each corresponding to a particular layer. The variable mask may change as the animation progresses.

The computing server 110 may generate an animation of the scene from the set of layers. The animation may include a change of perspectives of the scene. A perspective of the scene may correspond to a composite frame generated from the set of layers of images superimposed according to the variable masks specifying in different compositions of the layers in the plurality of regions. The different compositions in the plurality of regions change as the perspectives of the scene in the animation change. The change in perspective may be determined by a change in the position of a virtual camera that captures different portions of the input image. The change in perspective can be calculated based on a projection matrix using image transformation techniques.

The animation may be formed from a series of frames. Each frame may be generated from the same input image but is processed differently. Combining a series of changing frames may give an impression of a change in perspective and viewing angle to the viewers, thereby creating the perception of real depth and a change of camera angles in the animation even though the animation may be generated from a single image or a limited number of related images. For a particular frame in the animation, the computing server 110 may perform cropping of the image and certain image transformation to generate a perception of a change in camera pose such as the angle and/or the position. The variable mask corresponding to the particular frame may have different compositions of layers in different regions. One or more layers may be processed and generated to enhance certain effects (e.g., contrast, brightness, HDR, intentional blurriness, perspective). By specifying the compositions of various layers in different regions of the image, certain visual effects of the image may be enhanced at specific regions of the image. In the next frame, the image may be processed differently to slightly change the perception of the camera stance. The variable mask corresponding to this frame after the first frame may also be changed so that the visual effects of the images may be enhanced at different regions compared to the first frame. By continuing this process, an animation that has different visual effects and/or perspectives overtime may be generated from a single image or a small number of images.

Figure 2B:
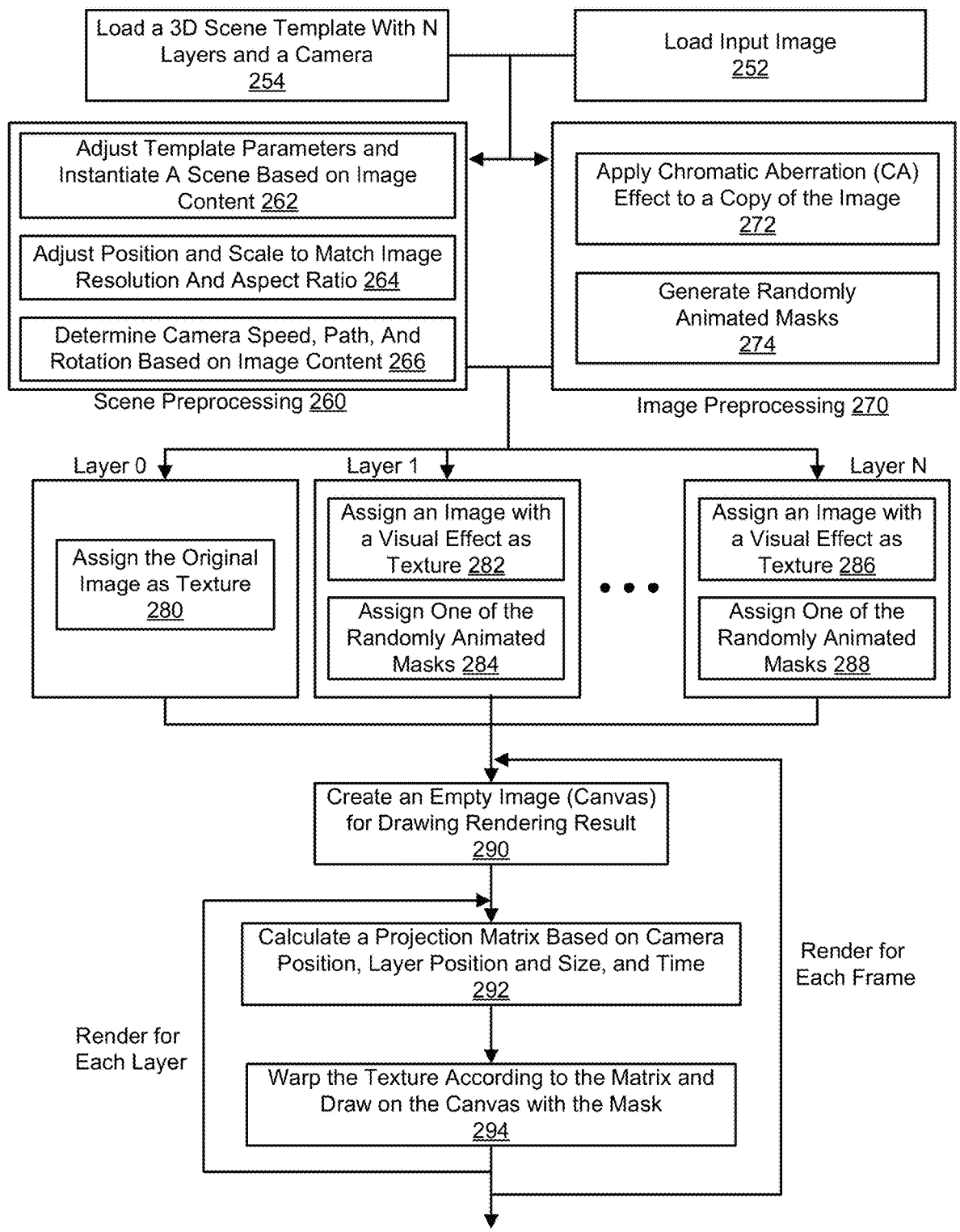
FIG. 2B is a flowchart depicting an example process that illustrates a software algorithm for generating an animation based on an input image, in accordance with some embodiments.

FIG. 2B is a flowchart depicting an example process 250 that illustrates a software algorithm for generating an animation based on an input image, in accordance with some embodiments. The software algorithm may be stored as computer instructions that are executable by one or more general processors (e.g., CPUs, GPUs, TPUs). The instructions, when executed by the processors, cause the processors to perform various steps described in the process 250. In various embodiments, one or more steps in the process 250 may be skipped or be changed. The process 250 may be performed by the computing server 110. The process 250 may be an example of the process 200 illustrated in FIG. 2A. While the process 250 is an example of process 200, the process 200 includes other implementations that may be used to generate an animation.

The computing server 110 may receive 252 an input image capturing a scene. In response to receiving the input image, the computing server 110 may load 254 a 3D scene template with multiple layers (e.g., three layers) and a virtual camera. In some embodiments, the computing server 110 may include various scene templates. In some cases, the computing server 110 may automatically select the template. In other cases, a user (e.g., a content generator) who uploaded the image may manually select on a user interface one of the templates provided by the computing server 110. The templates may be pre-set (e.g., default templates) or may be user-generated templates.

A 3D scene template may include various settings, configurations, and parameters that are associated with a particular template. One or more variables that determine how the animation is generated may be referred to as parameters. For example, the parameters may specify the number of layers, layer property, certain pre-processing image techniques that may be used, the setting of the virtual camera (e.g., filter, brightness, contrast, HDR, chromaticity, saturation, local effects, digital filter), predefined movement of the virtual camera, the animation setting, the timing setting, the settings related to the generation of variable masks, post-processing techniques, and other suitable settings. The computing server 110 may provide one or more predefined templates, each may be associated with a type of scene. For example, an outdoor landscape, an indoor room, and another particular environment may each be associated with a specific template that includes parameters and settings that are set for the scene. Each type of scene may be associated with a predetermined set of parameters. Alternative to or in addition to associating the templates with the type of scene, the templates may also be associated with the desired visual effects or the type of animation.

In a scene preprocessing stage 260, the loaded 3D scene template may further be adjusted based on the input image, whether automatically by the computing server 110 or by the manual selection from a user. The computing server 110 or a user may adjust 262 the template parameters and instantiate a scene based on image content. The computing server 110 or the user may also adjust 264 the position and scale of the template to match the image resolution and aspect ratio. The computing server 110 or the user may further determine 266 the speed, path, and rotation of the camera based on image content.

By way of example, the parameters used to generate the variable masks, the set of layers of images and the animation may be automatically adjusted 262 by the computing server 110 and/or be manually adjusted 262 by a user. Example parameters used may include the number of layers, the scaling factors for different layers, the distances from the simulated camera, the sizes of the images, etc. The parameters may be determined based on the scene (e.g., the type of scene) and object information of the scene. For example, a scene containing a natural landmark may have different scaling factors for the pyramid of images compared to another scene of a residential indoor unit.

In various embodiments, the computing server 110 may use various techniques to identify relevant information regarding the input image. For example, in one embodiment, the computing server 110 may use a machine learning model, such as a convolutional neural network, as a classifier to classify the type of scene. The computing server 110 may also apply an object detection technique to identify the objects in the scene. In another embodiment, the computing server 110 may also ask the uploader of the input image to classify the input image into one of the types of the scene and to identify relevant or key objects in the scene captured by the input image. Other suitable ways to determine the relevant information of the scene are also possible. The relevant information may be used to select the suitable template and/or be used to further adjust a selected template in the scene preprocessing 260. The computing server 110 may adjust the parameters used to generate the set of layers of images. In another instance, the parameters may be dynamically adjusted based on the scene and the objects (e.g., the type of objects, locations of the objects, relative sizes of the objects, etc.) in the input image.

The computing server 110 may also detect the size and the resolution of the input image to adjust 264 the position and scale associated with the template to match the image resolution and aspect ratio. In some cases, the area to be captured by the template may be smaller than the size of the input image and the frames in the animation may capture different areas of the input image to give the audience perception of a moving camera in a scene. In some cases, the aspect ratios of the animation may be determined by the template's setting and may match the input image. In other cases, the aspect ratios of the animation may be different from the input image and are selected by the users and/or based on the desired visual effects.

The speed, path and rotation of the virtual camera may also be determined 266 based on the image content automatically by the computing server 110 or manually selected by the user. The change of the pose of the camera may also include zooming in or zooming out. The rotation of the camera may include the yaw, pitch, and the roll. The rotation direction may be chosen based on the image content and object layout. In one example, the camera moves forward from the beginning of the animation to the end. The roll angle and direction can be chosen depending on the image content. The camera chooses 3 directions with a certain degree and direction. In total, there may be 8 or more combinations of rotation.

The movement of the camera may be determined in various suitable ways. For example, in one embodiment, a user may flag a key object or area in the input image. In response, the computing server 110 may automatically generate or suggest a path and change of perspective of the camera around the object or area. In another embodiment, a user may manually determine the pose of the camera at a different time of the animation. The user may select key stances at certain moments in time and the computing server 110 may automatically interpolate the pose to generate the rest of the movement paths and rotations of the camera. In yet another embodiment, the user may have complete control of the movement of the camera.

The computing server 110 may pre-process the input image in an image processing stage 270 before a set of layers are generated. A processed image may be a version of the input image. A version of the input image may be the unadjusted input image or an image that is processed using various image processing techniques. For example, the input image may be filtered, compressed, interpolated, extrapolated, cropped, resized, upscaled, downscaled, and/or otherwise adjusted in brightness, chromaticity, luminance, contrast, saturation in one or more color channels (in RGB, XYZ, etc.). One or more filters may also be applied to the input image. The input image may also be locally adjusted, such as by local blurring. The input image may also be resized to the intended resolution of the animation. The image that has the highest resolution that is used to generate the animation may be referred to as an originally sized image. The originally sized image may or may not have the same resolution as the input image.

In some embodiments, the computing server 110 may apply 272 a chromatic aberration (CA) effect to a copy of the image to generate a blurred version of the image. The chromatic aberration may include scaling each color channel of the input image differently. Other image distortion techniques, such as applying one or more image filters (Gaussian blurring, finite impulse response (FIR) filtering, etc.), may also be used. The blurred image may be more prominently displayed in some locations of the animation to give viewers an effect of distant objects in the image, thereby creating a perception of depth in the animation. Alternative to or in addition to blurring the image, the computing server 110 may also perform other types of image pre-processing of a copy of the image.

The computing server 110 may generate 274 different variable masks. Each of the masks may be used for a superposition of the set of layers of images to generate one or more frames in the animation. Variable masks may also be referred to as randomly animated masks. In one embodiment, a variable mask is an alpha mask. The variable mask includes different regions. Each region may specify a different composition of the layers in the superposition. A composition may include 0-100% of a particular layer. For example, in FIG. 5B, an example variable mask corresponding to a particular frame is shown. The mask may be divided into multiple blocks. Each block may correspond to a pixel or multiple pixels. Each block may represent a region that may or may not have the same composition of layers compared to other blocks. Each mask may be associated with a different layer. For example, the mask shown in FIG. 5B may be associated with one of the layers and a second mask with different patterns may be associated with another layer. Details of the generation of masks and how layers are superimposed are discussed in further detail with reference to FIG. 4A through FIG. 5C.

The computing server 110 generates a set of layers of images of the scene from the input image. The set of layers includes one or more processed images. The image in each layer may be a version of the input image. Each layer in the set of layers may be a processed image or the original input image.

Figure 3A:
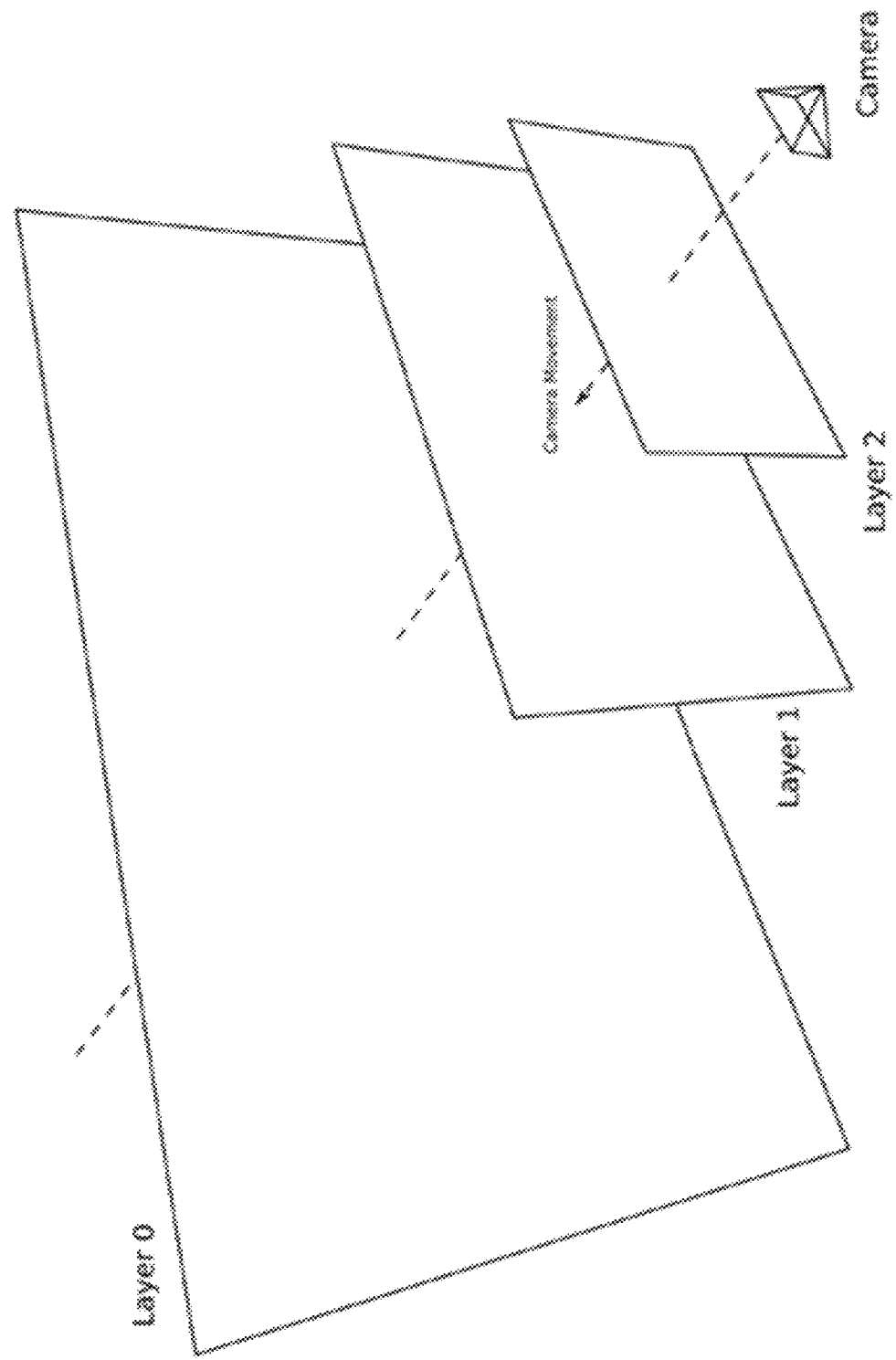
FIG. 3A is a conceptual diagram illustrating an example set of layers of images, in accordance with some embodiments.
Figure 3B:
FIG. 3B is a diagram illustrating an example pyramid of actual images, in accordance with some embodiments.

By way of example, the set of layers of images may be a pyramid of images that may include an originally sized image and one or more downscaled images. The originally sized image may have the highest resolution while the downscaled images have reduced resolutions. Examples of a set of layers of images are shown in FIGS. 3A and 3B. In one embodiment, the originally sized image may have a size that corresponds to the size of the input image. In another embodiment, the originally sized image may still be compressed or downscaled compared to the input image. The originally sized image may refer to an image having the same size as the size of the animation. In some pyramids, the originally sized image represents the highest resolution image in the pyramid of images. One or more downscaled images may be downscaled from the originally sized images based on one or more scaling factors. The pyramid of images may represent images taken from a simulated camera that have certain distances from the camera.

In one embodiment, one or more layers in the set of layers of images may further be adjusted. For example, in one case, one or more downscaled images may be simulated with chromatic aberration by scaling the red channel of the downscaled images. This may provide an impression to the viewer that the downscaled images are blurred and/or out of focus. Additionally, or alternatively, other image processing techniques may also be used. For example, in one case, one or more layers may be blurred. In another case, the brightness of one or more layers may be adjusted to enhance the contrast of the frames in the animation generated. Other image processing techniques discussed in the image preprocessing stage 270 may also be used. Also, the image processing technique used in each of the layers may be different.

In the specific example provided in FIG. 2B, the computing server 110 may assign 270 the original image as the texture of Layer 0. The computing server 110 may assign 272 a first downscaled image with a first type of visual effect as the texture of Layer 1. The visual effect may be generated by the image preprocessing stage 270. For example, the visual effect may be a chromatic aberration, but another visual effect may also be used. The computing server 110 may also assign 284 one of the animated masks to Layer 1. The animated mask may be randomly animated. The computing server 110 may assign 286 a second downscaled image (e.g., a further downscaled image compared to the first) with a second type of visual effect as the texture of Layer 2. The second type of visual effect may be the same as the first type of visual effect but may also be different. For example, in one embodiment, chromatic aberration is applied to both layers. The computing server 110 may also assign 288 another animated mask to Layer 2, which may also be randomly animated. The computing server 110 may repeat the downscaling and application of other animated masks for other additional layers, if more layers are used in one or more embodiments. For example, layer N may be layer 2 or another number larger than 2.

While a pyramid of images is shown in FIGS. 3A and 3B as an example of the set of layers of images of the scene, other suitable sets of layers may also be used. For example, the set of layers may include the input image and one or more blurred images to different extents that have the same size as the input image.

The computing server 110 uses the layers and the variable masks to render an animation. The application of a variable mask to superimpose the set of layers may be used to generate a composite frame (e.g., a frame that is generated by a composite of layers) that has apparently varying depths in various objects or locations in the scene. A frame may correspond to one of the perspectives of the scene. The composite frame may include various regions with different compositions of layers. A first composition of layers may correspond to a first object in the scene. A second composition of layers may correspond to a second object in the scene. By creating different visual effects on various layers and having different compositions in each region, the first object in a first region of the image may appear to be farther away than the second object in the frame that represents a particular perspective.

The computing server 110 may generate an animation of the scene from a set of layers. For example, the computing server 110 may create 290 an empty image (canvas) for drawing rendering results. For each layer, the computing server 110 may calculate 292 a projection matrix based on the virtual camera's position, layer position and size, and time. The computing server 110 may warp 294 the texture of each layer according to the matrix and draw the image with the mask on the canvas. After each layer is combined, a frame may be generated by superimposing the layers based on the compositions specified in one or more masks.

The animation may include a set of frames and may show a change of perspective of the scene. For example, the animation may simulate a virtual camera that captures the scene from various angles. In the animation, the change of perspective may give the impression that the virtual camera changes its pose by moving forward or backward or rotating with different angles. Motion blur may be applied as a preprocessing step to the image according to the direction of the camera movement. The computing server 110 may also calculate 292 a projection matrix based on the virtual camera's relative position, the layer position and size, and time.

The animation may include multiple clips, each may correspond to a perspective of the scene and may be generated from the set of layers of images superimposed in accordance with the variable mask specifying the different compositions of the layers in different regions of the masks. For example, each clip may be a set of composite frames that is made from superimposition of multiple layers of images. The computing server 110 may apply different variable masks to the layers to generate different frames such as different compositions in the regions change as the perspective of the scene in the animation changes. Each composite frame may capture a portion of the scene (e.g., a portion of the originally sized image). For example, as the virtual camera zooms in, the composite frames in the animation may capture a smaller portion of the scene. The compositions in various regions of the variable mask may change as the perspectives of the scene change. For example, as the virtual camera turns right, the frame in the animation may show that the right side of the scene is clearer than the left side, which may appear to be out of focus. The compositions in the right side regions of the mask may be changed to include more of the originally sized image while the compositions in the left side regions of the mask may be changed to include more of the downscaled images.

The computing server 110 may repeat steps 292 and 294 to render each layer. The computing server 110 may also repeat steps 290, 292, and 294 to render each frame. The variable mask's compositions and regions may change from frame to frame as the perspectives of the animation change when time progresses.

Example Set of Pyramid Layers

FIG. 3A is a conceptual diagram illustrating an example set of layers of images, in accordance with some embodiments. The example shown in FIG. 3A is a pyramid of images that have progressively smaller sizes from Layer 0 to Layer 2. FIG. 3B is a diagram illustrating an example pyramid of actual images. A virtual camera is instantiated and has an imaginary position relative to the layers of images. The computing server 110 may set each layer to be positioned to have different distances from the virtual camera. The virtual camera may have a viewing angle so that images closer to the camera have a smaller area captured by the camera while images farther away from the camera have a larger area. As such, the images in the layers may have different sizes to represent the areas captured by the camera. For example, in FIG. 3A, Layer 0 is scaled to $A_x$ of the original image size, and the distance to the camera is AAA. In some cases, $A_x$ equals to 1 so that the image in Layer 0 is the same size as the original image. Layer 1 is scaled to $B_x$ and the distance is BBB. Layer 2 is scaled to $C_x$ and the distance is CCC.

As the pose of the camera changes when the camera moves along a path when the animation progresses, the relative distance and angle between the layers and the camera also change. For example, in a particular stance, the camera may be no longer positioned at the common center of the set of layers. As such, the computing server 110 calculates 292 a projection matrix for the particular perspective based on the pose of the camera. To generate a composite frame, the computing server 110, in turn, superimposes the images in each layer based on the projection matrix and the composition of each layer specified by the variable mask corresponding to the layer.

A variable mask may change based on the depth information (e.g., inferred or actual depth information) of the objects in the scene so that the layer compositions at different regions may vary based on the intended perceived depths of the objects at those regions. For example, the computing server 110 may identify objects or regions in the scene and infer depths of those objects based on the pose of the virtual camera. For a particular frame corresponding to a specific camera pose, the computing server 110 may classify objects into different levels of depths. Regions of the scene with objects at different depths are shown by different layers (e.g., a region that is farthest away may predominantly display the most downscaled layer). Regions with objects that are closest or that are the focus of the particular frame may have high compositions of the Layer 0. As the virtual camera approaches an object, the region of the scene including the object will progressively display a clearer image of the layer 0 (e.g., masks for layers 1 and 2 may render Layer 1 and 2 increasingly transparent so that Layer 0 in the back may be seen).

Various compositions with different compositions of the layers of the image may be generated to simulate a change in perspective of the scene based on a movement of a virtual camera. The change in compositions of the layers gives viewers an impression of change in depth in various objects or regions in the scene.

In one embodiment, various parameters in generating the animation may be automatically determined by the computing server 110 based on the type of the scene and the objects present in the scene and/or based on manual adjustment by a user. The parameters may include various parameters in the set of layers as discussed above, the movement direction and speed of the virtual camera, various compositions, locations, shapes, sizes of the regions of the variable mask, and other suitable parameters in controlling the change of the variable mask. A set of parameters for a particular type of scene may be saved as a template and may be loaded for processing of additional images that capture similar types of scenes.

Example Variable Mask Generation Process

Figure 4A:
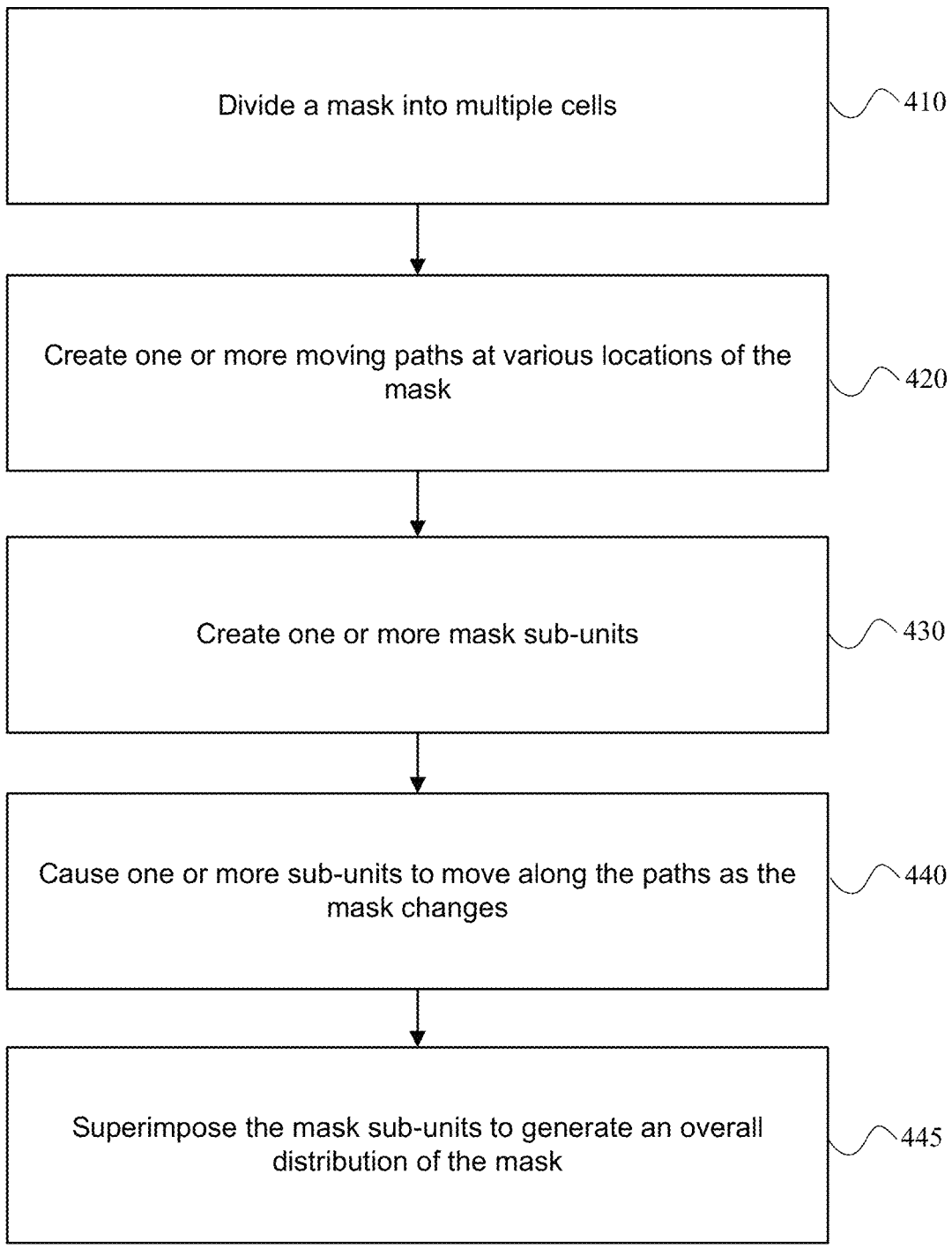
FIG. 4A is a flowchart depicting an example process that illustrates a software algorithm for generating a variable mask that changes as an animation progresses, in accordance with some embodiments.
Figure 4B:
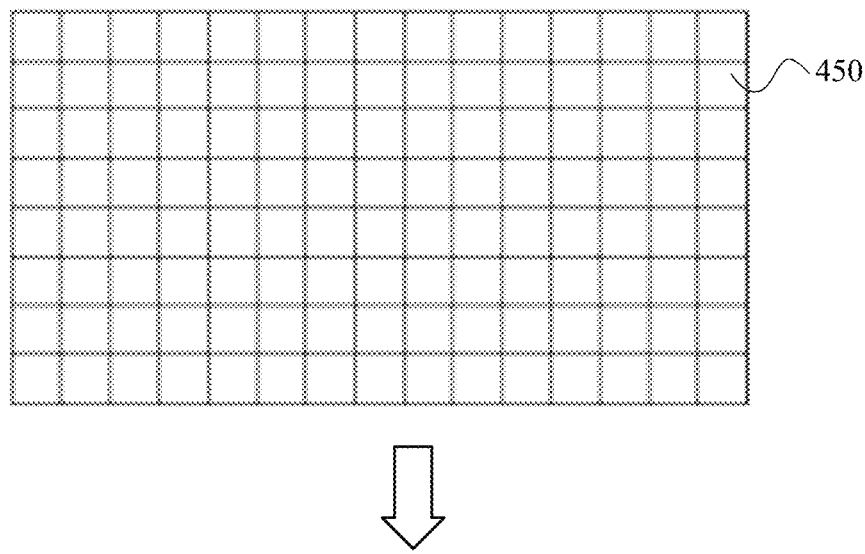
FIGS. 4B, 4C, and 4D are graphical illustrations of a mask generation process, in accordance with some embodiments.
Figure 4B:
Figure 4C:
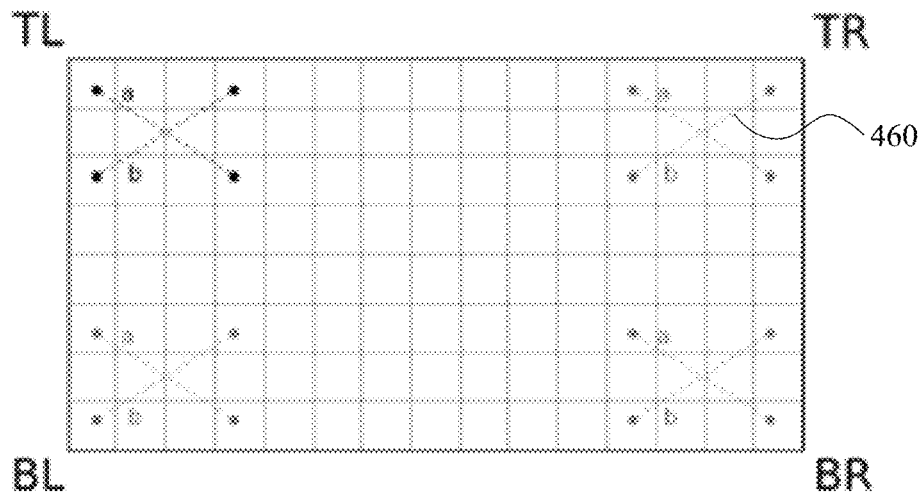
Figure 4C:
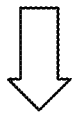
Figure 4D:
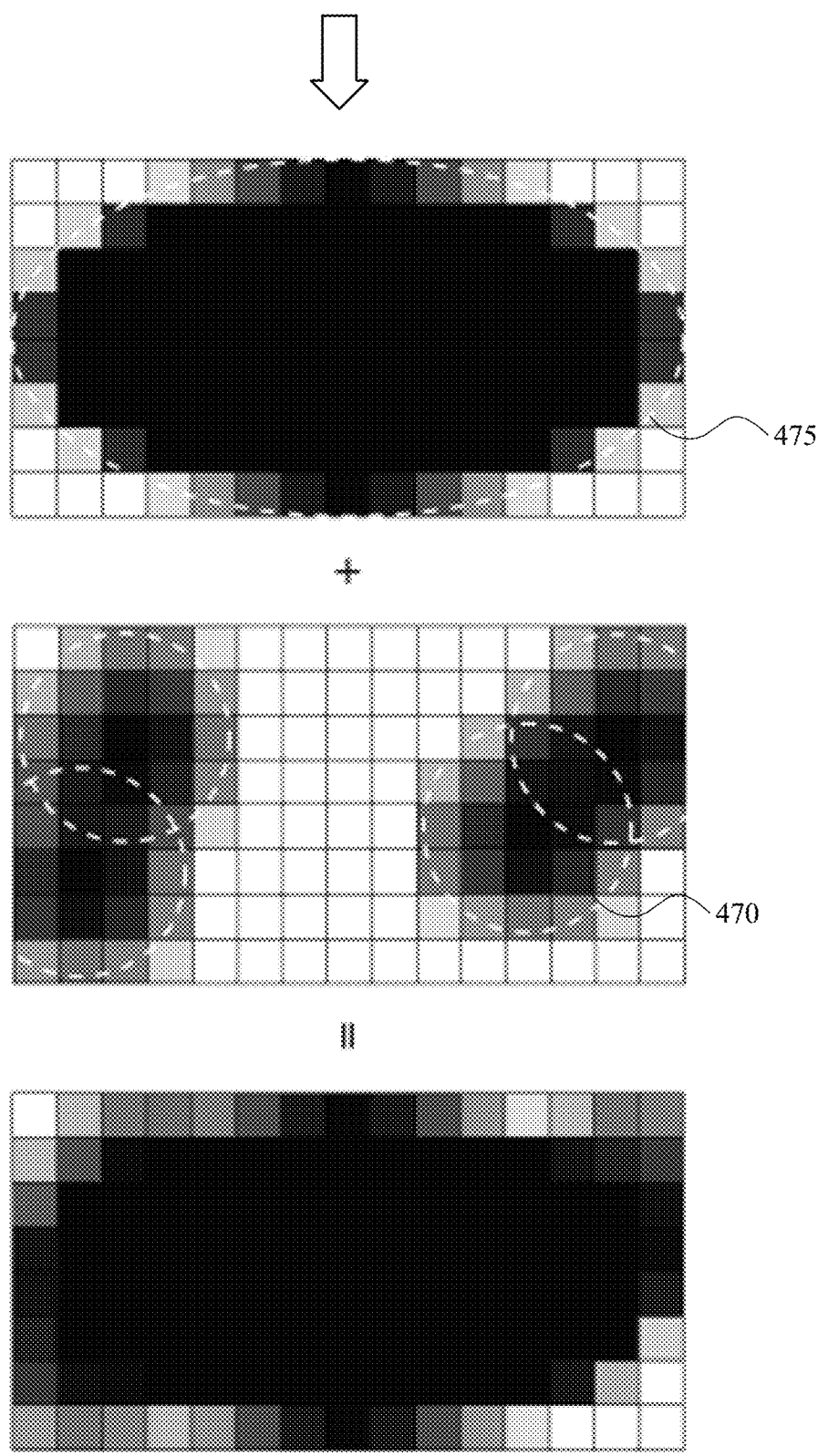

FIG. 4A is a flowchart depicting an example process 400 that illustrates a software algorithm for generating a variable mask that changes as an animation progresses, in accordance with some embodiments. The software algorithm may be stored as computer instructions that are executable by one or more general processors (e.g., CPUs, GPUs, TPUs). The instructions, when executed by the processors, cause the processors to perform various steps described in the process 400. In various embodiments, one or more steps in the process 400 may be skipped or be changed. The process 400 may be performed by the computing server 110. FIGS. 4B, 4C, and 4D are graphical illustrations of the mask generation process 400 discussed in FIG. 4A.

Referring to FIG. 4A in conjunction with FIGS. 4B and 4C, the computing server may divide 410 a mask into multiple cells 450. Each cell 450 may correspond to a region in the layer of the image. For example, the cells in the particular example shown in FIG. 4B are square cells and collectively form a grid using a particular aspect ratio, which may be the same aspect ratio as the originally sized image. In some embodiments, the mask may be divided into other types of cells, whether the cells are square, rectangular, triangular, circular, hexagonal or other identifiable shapes, regular or not, same shapes or not, and same sizes or not, and whether the mask is divided in a specific pattern or not, regularly or irregularly, symmetrically or asymmetrically.

To randomize mask animation, the computing server 110 may create 420 one or more moving paths 460 at various locations of the mask, such as at each of the four corners, as shown in FIG. 4C. A moving path may be used for a mask sub-unit 470 (e.g., a circle shown in FIG. 4D) to move around during the animation. In one example, each path is a cross defined by two line segments a and b in FIG. 4C. However, the paths 460 in FIG. 4C are examples only. The paths 460 for mask sub-units 470 may be the same or different, depending on various embodiments. Also, a path may be at any suitable location and of any suitable length and shape such as a linear, circular, cross, polygonal, or any other identifiable, symmetrical or not, linear or not, regular or not, equal length or not, arbitrary or not, path.

The computing server 110 may create 430 one or more mask sub-units, as shown in FIG. 4D. As the animation progresses, the computing server 110 may cause 440 one or more mask sub-units to move along the paths 460 as the mask changes. For example, a mask sub-unit 460 may start from an endpoint and moves along the path 460 back and forth at a constant or variable speed. Some mask sub-units may also be stationary. For example, in FIG. 4D, one of the mask sub-units 475, which has the ellipse shape, is fixed at the center. The circular sub-units 470 at corners are movable along the paths.

For each frame in the animation, the configuration of the variable mask may be determined based on the combination of the mask sub-units, as shown in FIG. 4D. For each frame, the computing server 110 may superimpose 445 the mask sub-units to generate the overall distribution of the variable mask. Since some of the mask sub-units, such as 470, may be moving, the mask is variable at different frames.

By way of example, in FIG. 4D, a mask may be made of one ellipse-shaped mask 475 at the center and four circles 470 at the corners. In various embodiments, the shapes and the number of shapes can be different. Those are parameters that may be scene object dependent and may be automatically determined by the computing server 110 based on the type of scene and the objects present. In the embodiment shown in FIG. 4D, the ellipse may be fixed at the center, while the four small circles move back and forth, each along a predefined straight line at one corner. In this example, for each corner, there may be two predefined trajectories. If a circle randomly uses one and starts at one end and if the period/speed is fixed, there can be 256 combinations (4^4). The trajectories, direction, and the period/speed may vary depending on different situations or different scene structure and layout. This increases the number of possible variations of the mask. For example, for a layer that has a processed image that is intended to be used to blur the background, the mask may concentrate in the center to cover the center part of the image so that the background near the peripheral regions is more pronounced. In another case, for a layer that has a processed image that is intended to be used to emphasize the center part, the mask may concentrate in the outer regions.

Figure 5B:
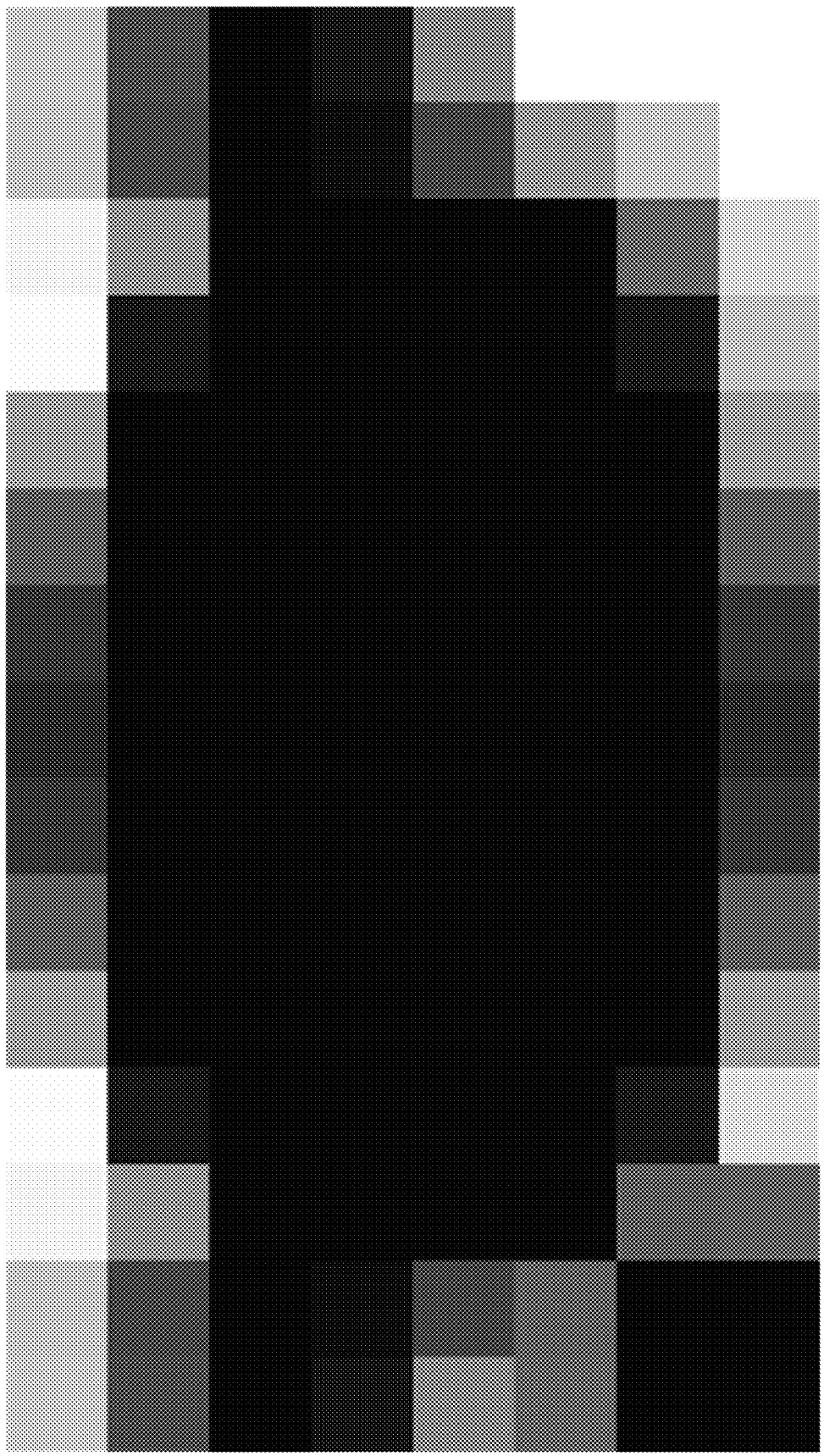
Figure 5C:
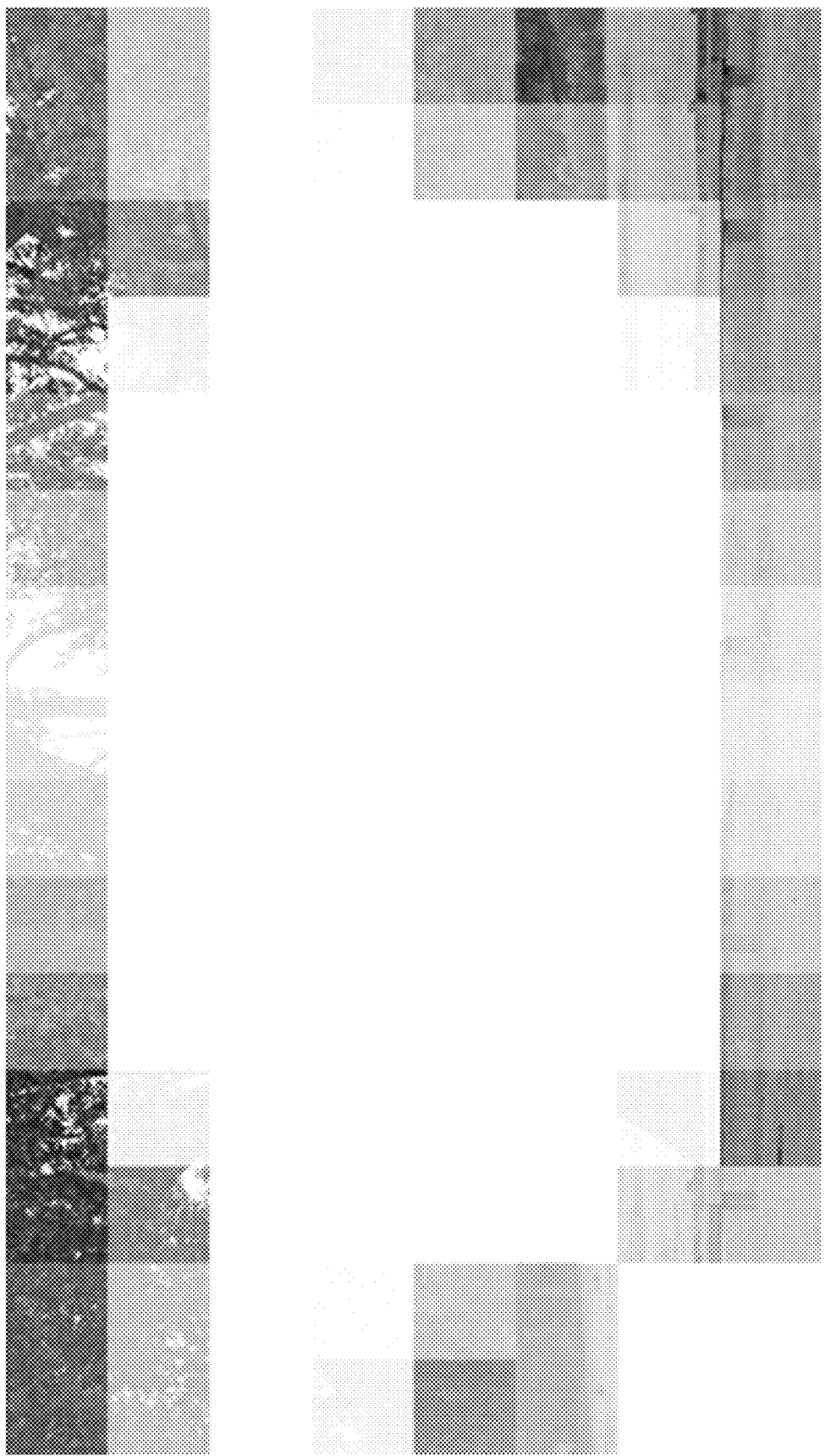

FIGS. 5A through 5C illustrates the effect of a mask on a layer of an image, in accordance with some embodiments. FIG. 5A is an example of an image, which may be one of the images corresponding to a layer. FIG. 5B shows an example distribution of a variable mask at a particular moment. FIG. 5C is a result of the image after the variable mask is applied to the image in FIG. 5A.

For example, a black block in the example variable mask in FIG. 5B may represent a composition of 0% for the corresponding layer (e.g., the layer is completely transparent for the region). A white block in the example variable mask may represent 0% of transparency so that the layer, if being a front layer, will have 100% of the composition in that region because the back layers will not be seen. Grey blocks may represent intermediate transparency of various degrees. The example distribution of the mask shown in FIG. 5B may be used with a layer that is intended for blurring the background. The center portion of the mask has a solid black large ellipse-shaped mask sub-unit that renders most of the center portion of the image transparent. The mask may be applied to a blurred image so that the edge of the output animation will have blurred outer regions. As a result, the outer region appears to be out of focus and, thus, the animation gives a perception of real depth.

Computing Machine Architecture

FIG. 6 is a block diagram illustrating components of an example computing machine that is capable of reading instructions from a computer-readable medium and executing them in a processor (e.g. a CPU, GPU, TPU, etc.). A computer described herein may include a single computing machine shown in FIG. 6, a virtual machine, a distributed computing system that includes multiple nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIG. 1, including but not limited to, the computing server 110, the user device 140, the third party server 150, and various engines, modules, interfaces, terminals, computing nodes and machines. While FIG. 6 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC). Parts of the computing system 600 may also include a memory 604 that stores computer code including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions including source code, and other communication signals and orders. Instructions may be used in a general sense and are not limited to machine-readable codes. The processors 602 may include one or more multiply-accumulate units (MAC units) that are used to perform computations of one or more processes described herein.

One and more methods described herein improve the operation speed of the processors 602 and reduces the space required for the memory 604. For example, the various processes described herein reduce the complexity of the computation of the processors 602 by applying one or more novel techniques that simplify the steps in analyzing data and generating results of the processors 602. The algorithms described herein also reduces the size of the models and datasets to reduce the storage space requirement for memory 604.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer to some processes to be performed by a processor, this should be construed to include a joint operation of multiple distributed processors.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include alphanumeric input device 612 (e.g., a keyboard), a cursor control device 614 (e.g., a mouse, a trackball, a joystick, a motion sensor, or other pointing instrument), a storage unit 616 (a hard drive, a solid state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

In various embodiments, a non-transitory computer readable medium that is configured to store instructions may be used. The instructions, when executed by one or more processors, cause the one or more processors to perform steps described in the above computer-implemented processes or described in any embodiments of this disclosure. In various embodiments, a system may include one or more processors and a storage medium that is configured to store instructions. The instructions, when executed by one or more processors, cause the one or more processors to perform steps described in the above computer-implemented processes or described in any embodiments of this disclosure.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not always imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method comprising:
   receiving an input image, the input image capturing a scene;
   generating a set of layers of images of the scene, the set of layers comprising one or more processed images, a processed image being a version of the input image;
   generating one or more variable masks that are used for a superposition of the set of layers, the variable masks comprising a plurality of regions specifying different compositions of the layers in the superposition; and
   generating an animation of the scene from the set of layers, the animation comprising a change of perspectives of the scene, a perspective of the scene corresponding to a composite frame generated from the set of layers of images superimposed according to the variable masks specifying the different compositions of the layers in the plurality of regions, wherein the different compositions in the plurality of regions change based on changing of the perspectives of the scene in the animation.

2. The computer-implemented method of claim 1, wherein the set of layers is a set of scaled versions of the input image.

3. The computer-implemented method of claim 2, wherein scaling factors used to generate the scaled versions are automatically detected based on the scene.

4. The computer-implemented method of claim 1, wherein at least one of the processed images being a simulated chromatic aberration version of the input image.

5. The computer-implemented method of claim 1, wherein at least one of the processed images being a blurred version of the input image.

6. The computer-implemented method of claim 1, wherein the different compositions in the variable masks are automatically detected based on the scene.

7. The computer-implemented method of claim 1, wherein the variable masks comprising a first sub-mask having a first composition and a second sub-mask having a second composition different from the first composition, and wherein generating the animation of the scene comprises moving the first sub-mask relative to second sub-mask as the perspectives of the scene change.

8. The computer-implemented method of claim 1, wherein the composite frame corresponding to one of the perspectives of the scene comprises a first composition of layers and a second composition of layers, the first composition corresponding to a first object and the second composition corresponding to a second object that appears to be farther away than the first object in the perspective.

9. The computer-implemented method of claim 1, wherein the change of perspectives of the scene includes one or more of the following: rolling, yawing, pitching, or zooming.

10. The computer-implemented method of claim 1, wherein generating at least one of the variable masks comprises:
    dividing the variable mask into multiple cells;
    creating one or more moving paths at various locations of the variable mask;
    creating one or more mask sub-units; and
    cause at least one of the mask sub-units to move along one of the paths.

11. The computer-implemented method of claim 10, wherein the at least one of the variable masks comprises a plurality of mask subunits, and wherein generating at least one of the variable masks further comprises:
    superimposing the mask sub-units to generate an overall distribution of the variable mask.

12. The computer-implemented method of claim 11, wherein the plurality of mask sub-units comprises a stationary mask sub-unit and a movable mask sub-unit.

13. The computer-implemented method of claim 10, wherein the one of the mask sub-units that moves along one of the paths moves randomly.

14. The computer-implemented method of claim 1, wherein the animation comprises a plurality of composite frames, generating at least one of the composite frames comprises: calculating a project matrix based on a virtual camera position.

15. The computer-implemented method of claim 1, wherein the animation is generated based on a virtual camera's change in positions relative to the set of layers.

16. The computer-implemented method of claim 1, wherein at least two layers in the set are associated with the variable masks, each of the at least two layers associated with a different variable mask.

17. The computer-implemented method of claim 1, wherein one of the layers in the set includes the input image that is unscaled.

18. A non-transitory computer-readable medium configured to store computer code comprising instructions, the instructions, when executed by one or more processors, cause the one or more processors to perform steps comprising:

receiving an input image, the input image capturing a scene;

generating a set of layers of images of the scene, the set of layers comprising one or more processed images, a processed image being a version of the input image;

generating one or more variable masks that are used for a superposition of the set of layers, the variable masks comprising a plurality of regions specifying different compositions of the layers in the superposition; and generating an animation of the scene from the set of layers, the animation comprising a change of perspectives of the scene, a perspective of the scene corresponding to a composite frame generated from the set of layers of images superimposed according to the variable masks specifying the different compositions of the layers in the plurality of regions, wherein the different compositions in the plurality of regions change based on changing of the perspectives of the scene in the animation change.

19. The non-transitory computer-readable medium of claim 18, wherein the set of layers is a set of scaled versions of the input image.

20. A system comprising:

one or more processors; and memory configured to store computer code comprising instructions, the instructions, when executed by the one or more processors, cause the one or more processors to perform steps comprising:

receiving an input image, the input image capturing a scene;

generating a set of layers of images of the scene, the set of layers comprising one or more processed images, a processed image being a version of the input image;

generating one or more variable masks that are used for a superposition of the set of layers, the variable masks comprising a plurality of regions specifying different compositions of the layers in the superposition; and generating an animation of the scene from the set of layers, the animation comprising a change of perspectives of the scene, a perspective of the scene corresponding to a composite frame generated from the set of layers of images superimposed according to the variable masks specifying the different compositions of the layers in the plurality of regions, wherein the different compositions in the plurality of regions change based on changing of the perspectives of the scene in the animation change; and a graphical user interface configured to display the animation.

21. The system of claim 20, wherein the set of layers is a set of scaled versions of the input image.

* * * * *